United States Patent
Eekhoff

(12) 
(10) Patent No.: US 6,241,452 B1
(45) Date of Patent: Jun. 5, 2001

(54) RAMP FOR USE WITH SERVICE VANS

(75) Inventor: David L. Eekhoff, Sioux Center, IA (US)

(73) Assignee: Link Mfg., Ltd., Sioux Center, IA (US)

( * ) Notice: Subject to any disclaimer, the term of this patent is extended or adjusted under 35 U.S.C. 154(b) by 0 days.

(21) Appl. No.: 09/188,421

(22) Filed: Nov. 9, 1998

(51) Int. Cl.$^7$ .................................................. B60P 1/44
(52) U.S. Cl. ............................................. 414/537; 14/71.1
(58) Field of Search ................................. 414/537, 538; 14/71.1, 69.5

(56) References Cited

U.S. PATENT DOCUMENTS

| | | | |
|---|---|---|---|
| 4,084,713 | * 4/1978 | Rohrs et al. | 414/537 |
| 4,966,516 | * 10/1990 | Varfanian | 414/537 |
| 4,979,867 | * 12/1990 | Best | 414/537 |
| 5,259,081 | * 11/1993 | Henderson | 414/537 X |

* cited by examiner

Primary Examiner—Frank E. Werner
(74) Attorney, Agent, or Firm—Zarley, McKee, Thomte, Voorhees & Sease; Dennis L. Thomte

(57) ABSTRACT

A ramp for use with a service van having a side door step positioned inwardly of a side door. A base plate is secured to the side door step and has the upper end of an upper deck pivotally secured thereto. The upper end of a lower deck is pivotally secured to the lower end of the upper deck with the upper and lower deck is being selectively pivotally movable from a stored position inwardly of the side door of the van to an operative ramp position wherein the ramp extends downwardly and outwardly from the side door of the ramp. The ramp is removably secured to the base plate to enable the upper and lower decks to be removed therefrom. A keeper is provided which extends between the base plate and the lower deck to maintain the upper and lower decks in their stored position.

6 Claims, 3 Drawing Sheets

RAMP FOR USE WITH SERVICE VANS

BACKGROUND OF THE INVENTION

1. Field of the Invention

This invention relates to a ramp and more particularly to a ramp which may be mounted in the side door opening of a service van.

2. Description of the Related Art

Maintenance personnel such as office cleaning crews travel from one job site to another in service vans. The service vans normally have a side door provided in the side of the van behind the passenger seat. Further, the service vans normally have a rear door formed therein. It is frequently necessary for the personnel to unload floor scrubbers, buffers, etc., from the interior of the rear portion of the van and the same is difficult due to the height of the van and the weight of the equipment. Sometimes the operator of the vehicle will carry wood planks or the like in the van to aid in unloading and loading heavy and bulky equipment. However, the wood planks or the like consume considerable space in the van and the planks may be dangerous to use due to the fact that the planks may slip as the equipment is being loaded or unloaded.

SUMMARY OF THE INVENTION

A ramp is disclosed for installation in a service van having a side door step positioned inwardly of a side door. The ramp comprises a base plate secured to the side door step with the base plate having a forward end and a rearward end. A generally rectangular upper deck is pivotally secured at its upper end, about a horizontal axis, to the base plate. A generally rectangular lower deck is pivotally secured at its upper end, about a horizontal axis, to the lower end of the upper deck. The upper and lower decks are selectively pivotally movable from a storage position to an operative ramp position. The upper and lower decks, when in their storage position, extend upwardly from the base plate with the bottom surface of the upper and lower decks being adjacent to one another. The upper and lower decks, when in their ramp position, extend downwardly and outwardly from the base plate so that the lower end of the lower deck is in engagement with the ground or some similar surface. Means is provided for selectively maintaining the upper and lower decks in their storage position.

It is therefore a principal object of the invention to provide a ramp for use with a service van having a side door step positioned inwardly of a side door.

A further object of the invention is to provide a foldable ramp which is secured to the side door step of a service van and which may be moved from a storage position inwardly of the side door to a ramp position wherein the ramp extends downwardly and outwardly from the side door of the service van to enable heavy equipment to be loaded and unloaded.

A further object of the invention is to provide a ramp of the type described including means for maintaining the ramp in its stored position.

Still another object of the invention is to provide a ramp of the type described which is safe and convenient to use.

Still another object of the invention is to provide a ramp of the type described which may be easily removed from the service van as required.

These and other objects will be obvious to those skilled in the art.

DESCRIPTION OF THE PREFERRED EMBODIMENT

Figure 1:
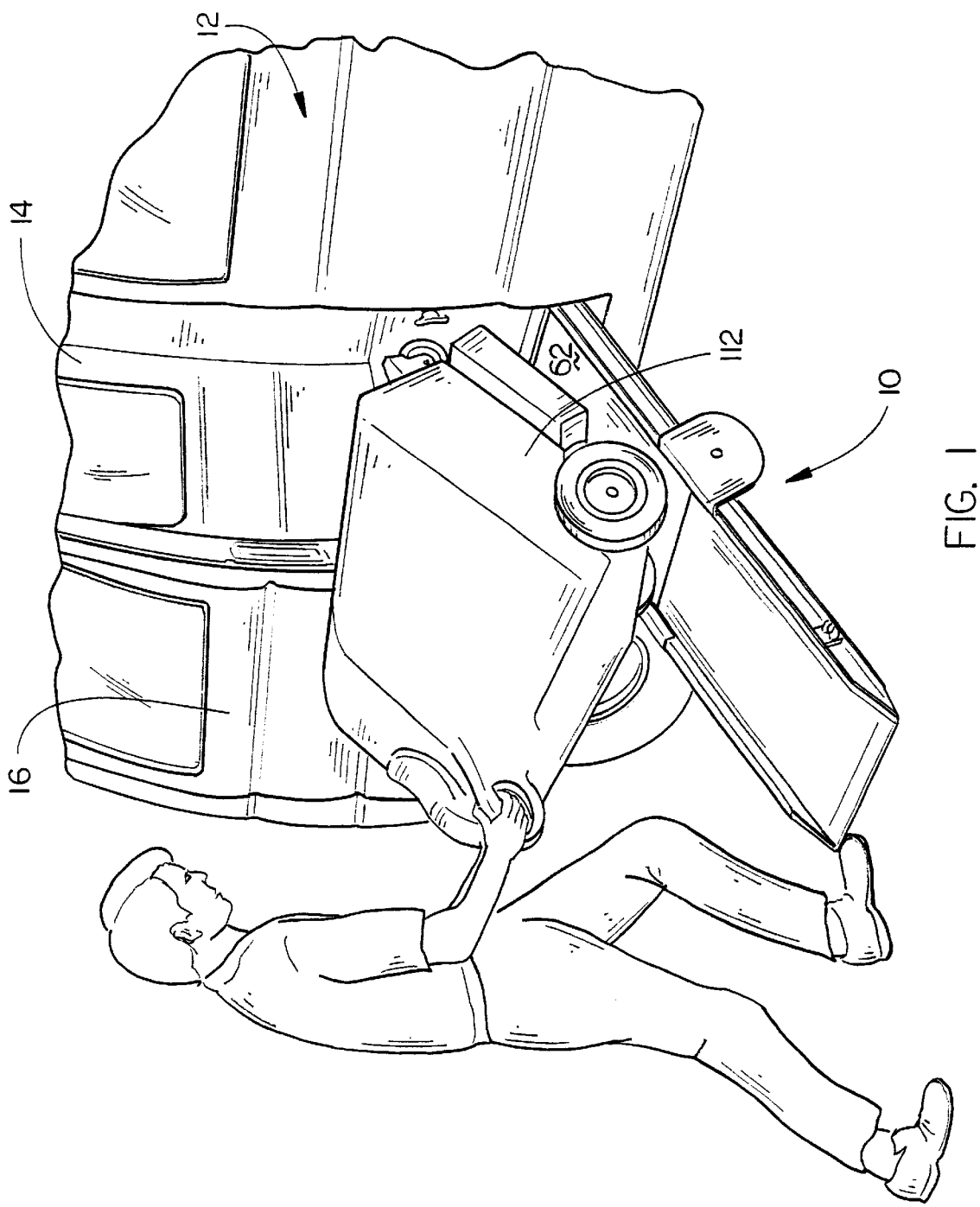
FIG. 1 is a perspective view illustrating the ramp of this invention in its operative position with a piece of equipment being moved thereover.
Figure 2:
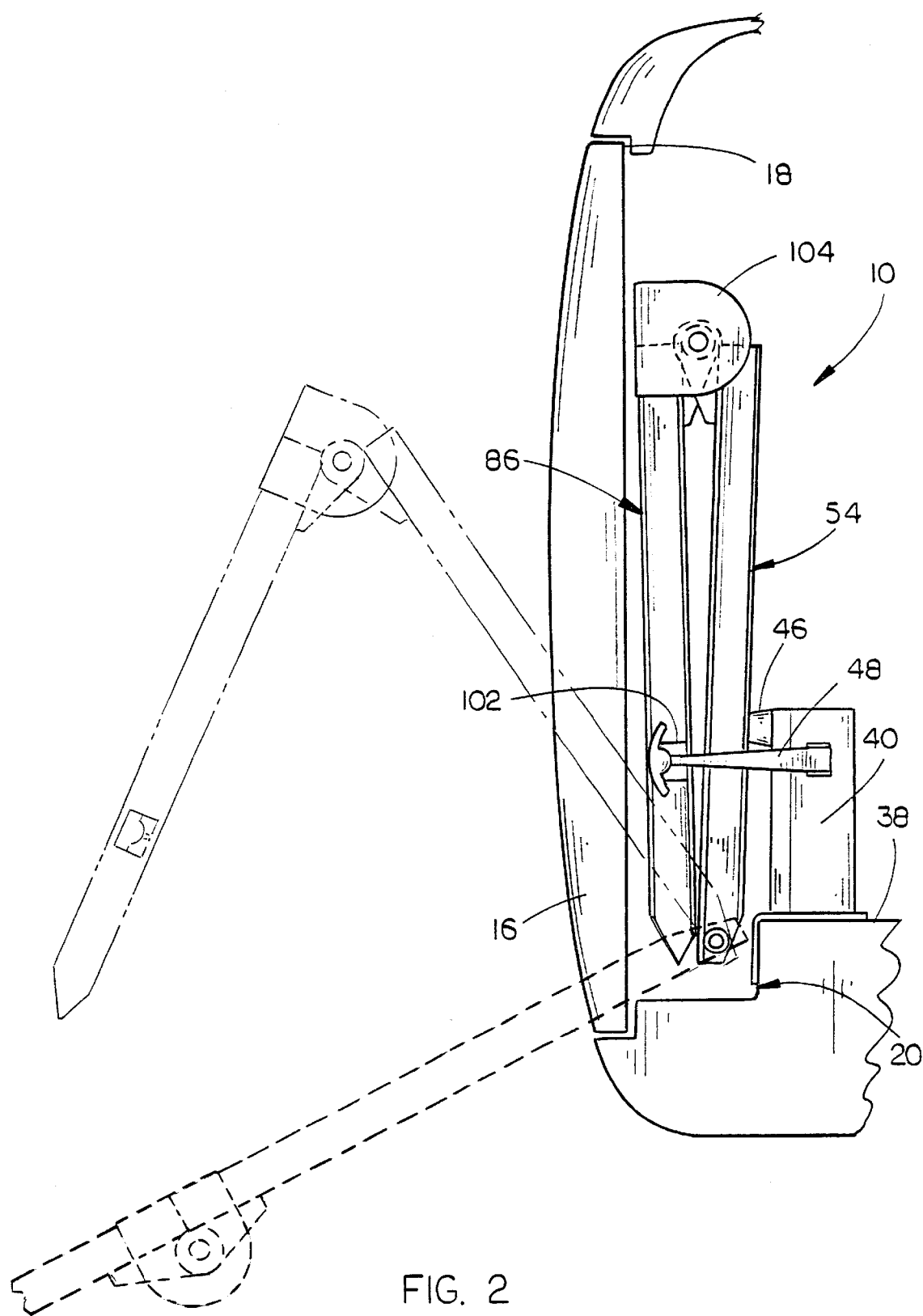
FIG. 2 is an end view of the ramp of this invention in its stored condition with the broken lines illustrating the movement of the ramp to its operative ramp position.

The ramp of this invention is referred to generally by the reference numeral 10 while the reference numeral 12 refers to a conventional service van including a rear door 14 and a side door 16. Side door 16 is longitudinally slidably moved with respect to the van 12 so as to be able to close opening 18. As in most service vans, step 20 is provided inwardly of the door 16. The ramp 10 of this invention is secured to the service van as will be described hereinafter so that it is positioned inwardly of the door 16 when in its stored position, as illustrated in FIG. 2, but which may be moved outwardly and downwardly to its operative or ramp position, as illustrated in FIG. 1, and as illustrated by broken lines in FIG. 2.

Ramp 10 includes a step plate mount having a plurality of elongated openings 24 formed in vertical wall portion 26. A pair of brackets 28 and 30 are secured to the forward and rearward ends of the step plate mount 22 which have bushings or collars 32 and 34 provided thereon for a purpose to be described hereinafter. Step plate mount 22 is secured to the step 20 by bolts, screws or the like extending through slots 24, with the wall 26 being positioned outwardly of the vertical wall of the step 20 and with the horizontal wall 36 of step plate mount 22 being positioned on the horizontal portion 38 of step 20, as illustrated in FIG. 2.

Figure 3:
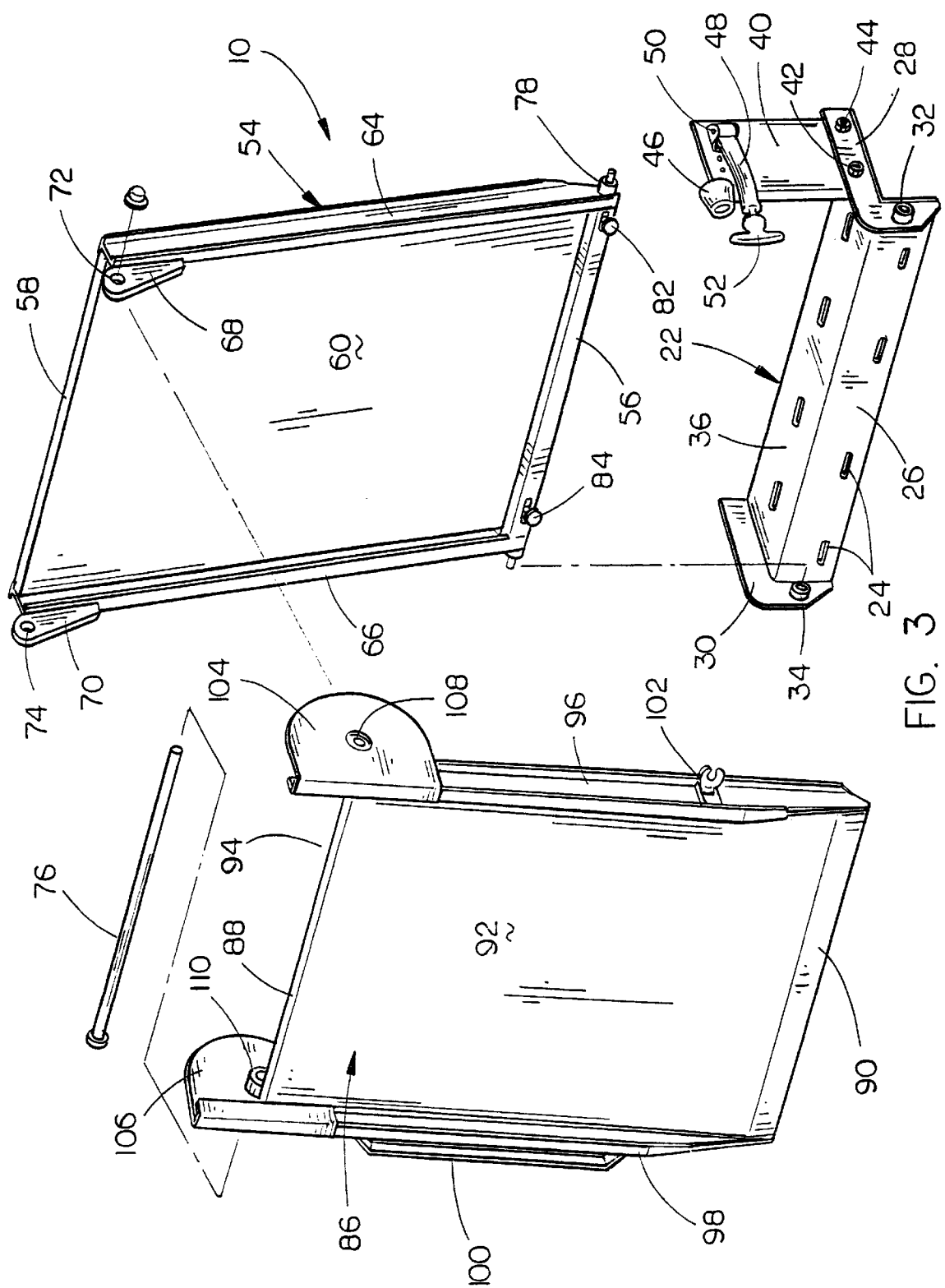
FIG. 3 is an exploded perspective view of the ramp of this invention.

Bracket 40 is secured to bracket 28 by bolt assemblies 42 and 44 and extends upwardly therefrom, as illustrated in FIG. 3. Bumper 46 is mounted on the bracket 40 at the upper outer end thereof, as also illustrated in FIG. 3. A resilient keeper draw latch 48 is hingedly connected to the upper end of bracket 40 at 50 and has a handle or keeper 52 at its outer end.

The numeral 54 refers to an upper ramp having an upper end 56, lower end 58, bottom surface 60 and top surface 62. Channel members 64 and 66 are provided at the forward and rearward sides of the ramp 54 and have hinge brackets 68 and 70 secured to the lower ends thereof which have openings 72 and 74 formed therein adapted to receive axle 76 therein. Spring loaded hinge arm bolts 78 and 80 are provided at the upper ends of channel members 64 and 66 and are normally urged to their extended positions by springs associated therewith. The bolts 78 and 80 may be moved to their retracted positions through the use of the knobs 82 and 84. The outer ends of the bolts 78 and 80 are received by the collars 32 and 34, respectively, to pivotally mount the upper end of ramp 54 to the step plate mount 22. If it is desired to remove the ramp from the service van, the bolts 78 and 80 may be withdrawn from the collars 32 and 34.

The numeral 86 refers to the lower ramp which has an upper end 88 and a lower end 90. Lower ramp 86 includes a top surface 92 and a bottom surface 94. Channel members 96 and 98 are provided at the forward and rearward sides of the lower ramp 86, as illustrated in the drawings. Handle 100 is secured to channel member 96 to enable the ramp to be grasped and to move the ramp from its stored position to its ramp position and vice versa. Draw latch 102 is secured to channel member 96 and is adapted to receive the keeper or handle 52 therein to maintain the ramp in its stored position, as illustrated in FIG. 2. The upper ends of channel members 96 and 98 have pinch point guards 104 and 106 secured thereto which have collars 108 and 110 mounted thereon which receive the axle 76, as illustrated in the drawings.

Assuming that only the step plate mount 22 is secured to the van 12 as previously described, the ramp may be mounted thereon by retracting the bolts 78 and 80 through the use of the knobs 82 and 84 to position the bolts 78 and 80 in alignment with the collars 32 and 34 at which time the bolts 78 and 80 may be moved outwardly into engagement with the collars 32 and 34, respectively. When the ramp is in its stored position, as illustrated in FIG. 2, the engagement of the keeper 52 with the draw latch 102 maintains the ramp in its stored position and maintains the ramp inwardly of the door 16, as illustrated in FIG. 2. When it is desired to unload equipment from the interior of the van 12, door 16 is moved to its open position and the keeper 52 is removed from the draw latch 102. Through the use of the handle 100, the ramp is moved from the position illustrated by solid lines in FIG. 2 to the position illustrated by broken lines in FIG. 2. The equipment such as a scrubbing machine 112 may be then moved downwardly over the ramp in a convenient manner. When it is desired to move the ramp from its operative ramp position of FIG. 1 to the stored position of FIG. 2, the handle 100 is grasped and the ramp is moved from the position of FIG. 1 to the position of FIG. 2. When the ramp is in its stored position, as illustrated in FIG. 2, it does not occupy a great deal of space so that the van may be used to its full carrying capacity. The van may be used for other purposes by simply removing the ramp as previously described. Although it has been described that the ramp is ideally suited for use in the side door of a service van, it is believed that the ramp could also be utilized at the rear of the van with slight modifications thereof. However, it should be noted that the use of the ramp at the side of the service van is the preferred embodiment.

Thus it can be seen that the invention accomplishes at least all of its stated objectives.

I claim:

1. In combination with a service van having a side door step positioned inwardly of a side door, comprising:

a base plate secured to said side door step;

said base plate having a forward end and a rearward end;

a generally rectangular upper deck having upper and lower ends, a forward end and a rearward end, an upper surface and a lower surface;

said upper end of said upper deck being removably pivotally secured, about a horizontal axis, to said base plate;

a generally rectangular lower deck having upper and lower ends, a forward end and a rearward end, an upper surface and a lower surface;

said upper end of said lower deck being pivotally secured, about a horizontal axis, to said lower end of said upper deck;

said upper and lower decks being selectively pivotally movable from a storage position to an operative ramp position;

said upper and lower decks, when in their said storage position, extending upwardly from said base plate with the bottom surface of said upper and lower decks being adjacent to one another;

said upper and lower decks, when in their said ramp position, extending downwardly and outwardly from said base plate so that the lower end of said lower deck is in engagement with the ground or with some other similar surface;

and means for selectively maintaining said upper and lower decks in their said storage position;

said upper deck having retractable bolts attached thereto, said retractable bolts being biased into operational engagement with said base plate so that said upper deck is selectively removably secured to said base plate.

2. The combination of claim 1 wherein said means for selectively maintaining said upper and lower decks in their said storage position comprises a keeper secured to and extending between said lower deck and said base plate.

3. The combination of claim 2 wherein said keeper is resilient.

4. In combination with a service van having a floor surface positioned inwardly of a door, comprising:

a mounting plate secured to said floor surface;

said mounting plate having first and second ends;

a generally rectangular upper deck having upper and lower ends, an upper surface and a lower surface;

said upper end of said upper deck being removably pivotally secured, about a horizontal axis, to said mounting plate;

a generally rectangular lower deck having upper and lower ends, an upper surface and a lower surface;

said upper end of said lower deck being pivotally secured, about a horizontal axis, to said lower end of said upper deck;

said upper and lower decks being selectively pivotally movable from a storage position to an operative ramp position;

said upper and lower decks, when in their said storage position, extending upwardly from said mounting plate with the bottom surface of said upper and lower decks being adjacent to one another;

said upper and lower decks, when in their said ramp position, extending downwardly and outwardly from said mounting plate so that the lower end of said lower deck is in engagement with the ground or with some other similar surface;

and means for selectively maintaining said upper and lower decks in their said storage position;

said upper deck having retractable bolts attached thereto, said retractable bolts being biased into operational engagement with said mounting plate so that said upper deck is selectively movably secured to said mounting plate.

5. The combination of claim 4 wherein said means for selectively maintaining said upper and lower decks in their said storage position comprises a keeper secured to and extending between said lower deck and said mounting plate.

6. The combination of claim 5 wherein said keeper is resilient.

* * * * *